United States Patent
Kose et al.

(10) Patent No.: US 12,441,035 B2
(45) Date of Patent: Oct. 14, 2025

(54) URETHANE FOAM-MOLDED ARTICLE AND METHOD FOR PRODUCING SAME

(71) Applicant: Sumitomo Riko Company Limited, Aichi (JP)

(72) Inventors: Takahisa Kose, Aichi (JP); Toshiya Nonaka, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 228 days.

(21) Appl. No.: 18/500,991

(22) Filed: Nov. 2, 2023

(65) Prior Publication Data
US 2024/0058996 A1 Feb. 22, 2024

Related U.S. Application Data

(63) Continuation of application No. PCT/JP2023/018945, filed on May 22, 2023.

(30) Foreign Application Priority Data

Jun. 24, 2022 (JP) .................................. 2022-101935

(51) Int. Cl.
B29C 44/04 (2006.01)
B29K 75/00 (2006.01)
B29K 105/00 (2006.01)
B29K 505/12 (2006.01)

(52) U.S. Cl.
CPC .......... *B29C 44/04* (2013.01); *B29K 2075/00* (2013.01); *B29K 2105/251* (2013.01); *B29K 2505/12* (2013.01); *B29K 2995/0013* (2013.01)

(58) Field of Classification Search
CPC ................ B29C 44/04; B29K 2075/00; B29K 2105/251
See application file for complete search history.

(56) References Cited

FOREIGN PATENT DOCUMENTS

JP 2011225833 11/2011

*Primary Examiner* — James Sanders
(74) *Attorney, Agent, or Firm* — JCIPRNET

(57) ABSTRACT

A urethane foam-molded article has a base material made of polyurethane foam and composite particles that are included and oriented in the base material. The composite particles have thermally conductive particles that are made of a non-magnetic material and have a thermal conductivity of 200 W/m·K or higher and magnetic particles attached to the surfaces of the thermally conductive particles with a binder and are surface-treated with one or more surfactants selected from a carboxylic acid-type surfactant and a succinic acid-type surfactant.

11 Claims, 1 Drawing Sheet

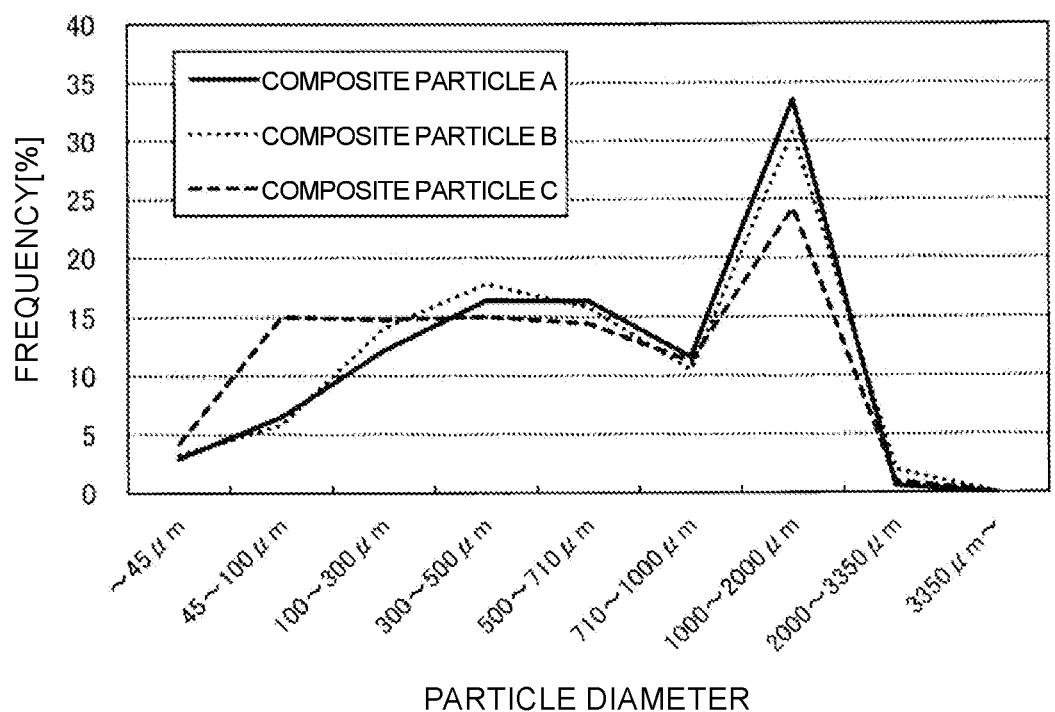

URETHANE FOAM-MOLDED ARTICLE AND METHOD FOR PRODUCING SAME

CROSS REFERENCE TO RELATED APPLICATIONS

This application is a Continuation of PCT International Application No. PCT/JP2023/018945, filed on May 22, 2023, which claims priority under 35 U.S.C. § 119(a) to Patent Application No. 2022-101935, filed in Japan on Jun. 24, 2022, all of which are hereby expressly incorporated by reference into the present application.

TECHNICAL FIELD

The present disclosure relates to a urethane foam-molded article having a high thermal conductivity and a method for producing the same.

BACKGROUND ART

Urethane foam-molded articles are in use in a variety of fields such as automobiles and electronic equipment as sound-absorbing materials or vibration-absorbing materials. Urethane foam-molded articles have a number of cells (bubbles) inside and thus have a low thermal conductivity and a poor heat dissipation property. Therefore, in a case where a urethane foam-molded article is disposed around an engine, a motor or the like accompanied by the generation of heat, there is a concern that heat may accumulate in the urethane foam-molded article and the temperature may rise. In order to solve this problem, for example, as described in Patent Literature 1, a urethane foam-molded article having a heat dissipation property improved by disposing particles having a high thermal conductivity, such as graphite, to be oriented in polyurethane foam and forming a heat transfer path in the orientation direction has been developed.

CITATION LIST

Patent Literature

[Patent Literature 1]
Japanese Patent Laid-Open No. 2011-225833

SUMMARY OF INVENTION

Technical Problem

In the urethane foam-molded article described in Patent Literature 1, in order to orient the particles having a high thermal conductivity (thermally conductive particles), composite particles obtained by granulating the particles after magnetic particles are attached to the surfaces of the particles are used. In addition, the composite particles are mixed with a foam urethane resin raw material and foam-molded in a magnetic field, whereby a urethane foam-molded article having the oriented composite particles is produced. When the configuration or size of the particles is not consistent in the case of mixing the particles with the foam urethane resin raw material, it becomes difficult to control a crosslinking reaction and a foaming reaction during foam molding. In addition, when there is a large mass difference among the particles to be blended, the fluidity of the particles changes during foam molding, the particles are not uniformly dispersed in the foam urethane resin raw material, and the performance such as a heat dissipation property varies. Particularly, in the case of blending the composite particles, the orientation thereof is involved in the formation of the heat transfer path, and the state of the magnetic particles being attached to the thermally conductive particles, that is, the granularity of the composite particles becomes important. However, in the related art, there have been no sufficient studies regarding the granularity of composite particles, and there is thus a concern that a heat dissipation property and moldability may become uneven in urethane foam-molded articles.

The present disclosure has been made in consideration of such circumstances, and the present disclosure provides a urethane foam-molded article in which the granularity of composite particles to be blended is favorable and the thermal conductivity and the moldability are excellent. In addition, the present disclosure further provides a method for producing the same.

Solution to Problem (1) A urethane foam-molded article of the present disclosure has a base material made of polyurethane foam and composite particles that are included and oriented in the base material, the composite particles have thermally conductive particles that are made of a non-magnetic material and have a thermal conductivity of 200 W/m·K or higher and magnetic particles attached to the surfaces of the thermally conductive particles with a binder and are surface-treated with one or more surfactants selected from a carboxylic acid-type surfactant and a succinic acid-type surfactant.

The composite particles that are included in the urethane foam-molded article of the present disclosure are surface-treated with a predetermined surfactant. This makes it easy for the magnetic particles to be attached to the thermally conductive particles. The majority of the magnetic particles are poor in terms of hydrophilicity. Therefore, when a binder was added together with water at the time of producing the composite particles, it was difficult for the magnetic particles to be attached to the thermally conductive particles, consequently, it was not possible to produce desired composite particles, and there was a concern that magnetic particles that were not attached to the thermally conductive particles after granulation might remain. Therefore, as a result of repeating studies by the present inventors, it was found that the joint use of a binder and a surfactant at the time of granulation makes it possible to enhance the attachment property of the magnetic particles to the thermally conductive particles. A urethane foam-molded article is produced by blending the granulated composite particles with a foam urethane resin raw material and foam-molding the blend in a magnetic field. Therefore, there is a need to select a surfactant that is less likely to affect a crosslinking reaction and a foaming reaction during the foam molding as the surfactant that is used during the granulation. Due to this point, one or more selected from a carboxylic acid-type surfactant and a succinic acid-type surfactant are used in the urethane foam-molded article of the present disclosure. The carboxylic acid-type surfactant and the succinic acid-type surfactant are weakly acidic surfactants and have a small influence on the crosslinking reaction and the foaming reaction of the foam urethane resin raw material. Therefore, the use of the surfactant makes it possible to produce composite particles in which a desired amount of the magnetic particles have been attached to the surfaces of the thermally conductive particles and makes it possible to produce a urethane foam-molded article without impairing the foam molding. Additionally, the surface treatment of the composite particles suppresses the generation of rust in the composite particles.

According to the urethane foam-molded article of the present disclosure, since the orientation of the composite particles is favorable and a heat transfer path is formed by the composite particles connected with each other, it is possible to realize a high thermal conductivity. In addition, since the unevenness in the configuration or size of the composite particles becomes small, it is easy to control the crosslinking reaction and the foaming reaction during the foam molding, and the moldability is excellent. In addition, since the dispersibility of the composite particles is also favorable, the performance such as the heat dissipation property is less likely to vary depending on places.

(2) In the above-described configuration, the succinic acid-type surfactant may be included as the surfactant. The succinic acid-type surfactant does not only have a small influence on foam molding but also exhibits an excellent anti-rust property. Therefore, even when a material that is likely to rust, such as iron, is used as the magnetic particles, it is possible to suppress the generation of rust during granulation where water is used or the like. According to the present configuration, since it is possible to use a relatively inexpensive material such as iron as the magnetic particles, it is possible to cut the production cost.

(3) In any of the above-described configurations, the surfactant may be water-soluble. According to the present configuration, since it is possible to dissolve and add the surfactant to and in water during the granulation of the composite particles, it is possible to easily perform the surface treatment.

(4) In any of the above-described configurations, in a particle size distribution of the composite particles, a content proportion of small particles having a particle diameter of 100 μm or less may be 10 mass % or less in a case where a total mass of the composite particles is set to 100 mass %. As described below, since a number of particles having a particle diameter of more than 100 μm are included as the thermally conductive particles, small particles having a particle diameter of 100 μm or less become magnetic particles that do not configure the composite particles or the like. In the present configuration, the proportion of magnetic particles that are not attached to the thermally conductive particles is small, in other words, the proportion of the composite particles that have a favorable granularity and include the magnetic particles attached to the surfaces of the thermally conductive particles is large, which is effective for realizing a high thermal conductivity and high moldability.

(5) In any of the above-described configurations, an average particle diameter of the thermally conductive particles may be 200 μm or more and 2000 μm or less. According to the present configuration, such an average particle diameter is advantageous in forming a heat transfer path, and the dispersibility of the composite particles can also be secured.

(6) In any of the above-described configurations, the magnetic particles may have iron particles. Since iron is relatively inexpensive, according to the present configuration, it is possible to cut the production cost. In addition, the composite particles are surface-treated with a surfactant. The surfactant exhibits an anti-rust action, which makes it possible to suppress the rusting of the iron particles.

(7) In any of the above-described configurations, the composite particles may have insulating inorganic particles attached to the surfaces of the thermally conductive particles with a binder. The insulating inorganic particles may be directly attached to the surfaces of the thermally conductive particles or may be indirectly attached through the magnetic particles, that is, attached to the surfaces of the magnetic particles attached to the thermally conductive particles. As the magnetic particles, a ferromagnetic material such as stainless steel or iron is used. Therefore, the composite particles having the magnetic particles attached to the surfaces of the thermally conductive particles are highly thermally conductive. Here, when the insulating inorganic particles are further attached to the surfaces of the thermally conductive particles, the thermally conductive particles or the magnetic particles (electrically conductive particles) are less likely to come into contact with each other between the composite particles adjacent to each other even when the composite particles are oriented in a state of being in contact with each other. Therefore, the electrical resistance between the composite particles becomes large. In addition, the composite particles come into contact with each other through the insulating inorganic particles, which makes it possible to cut electrical conduction between the composite particles. As a result, it is possible to realize an electrically insulating property in the urethane foam-molded article of the present disclosure. As described above, according to the present configuration, it is possible to realize both a high thermal conductivity and a high electrically insulating property. Therefore, the urethane foam-molded article of the present disclosure can be used in uses where both a heat dissipation property and an electrically insulating property are required, such as a heat dissipation member in electronic equipment. In addition, it is more effective to combine the present configuration with all of the configurations (2) to (6).

(8) A method for producing a urethane foam-molded article of the present disclosure, which is one aspect of a method for producing a urethane foam-molded article of the present disclosure, has a composite particle production step of producing composite particles by stirring a granulation raw material having a powder of thermally conductive particles that are made of a non-magnetic material and have a thermal conductivity of 200 W/m·K or higher, a powder of magnetic particles, a binder, one or more surfactants selected from a carboxylic acid-type surfactant and a succinic acid-type surfactant and water, a mixed raw material production step of producing a mixed raw material by mixing a powder of the composite particles and a foam urethane resin raw material, and a foam molding step of pouring the mixed raw material into a cavity of a foaming mold and performing foam molding while applying a magnetic field such that a magnetic flux density in the cavity becomes substantially uniform.

In the composite particle production step, a predetermined surfactant is used at the time of attaching the magnetic particles to the surfaces of the thermally conductive particles with the binder. This makes it easy for the magnetic particles to be attached the thermally conductive particles and makes it possible to produce desired composite particles to which a relatively large amount of the magnetic particles are attached. When a relatively large amount of the magnetic particles are made to configure the composite particles, it is possible to realize an orientation state of the composite particles even in a relatively low magnetic field in the subsequent foam molding step. In addition, the surfactant being used is less likely to affect the foam molding of the foam urethane resin raw material. As described above, according to the production method of the present disclosure, it is possible to produce desired composite particles having the magnetic particles attached to the surfaces of the thermally conductive particles, and it is possible to easily produce the urethane foam-molded article of the present disclosure having a high thermal conductivity without impairing foam molding.

(9) The method for producing a urethane foam-molded article of the present disclosure, which is one aspect of a method for producing a urethane foam-molded article of the configuration (7), has a composite particle production step of producing composite particles, a mixed raw material production step of producing a mixed raw material by mixing a powder of the composite particles and a foam urethane resin raw material, and a foam molding step of pouring the mixed raw material into a cavity of a foaming mold and performing foam molding while applying a magnetic field such that a magnetic flux density in the cavity becomes substantially uniform, the composite particle production step has a first stirring step of stirring a first raw material having a powder of thermally conductive particles that are made of a non-magnetic material and have a thermal conductivity of 200 W/m·K or higher, a powder of magnetic particles, a binder, one or more surfactants selected from a carboxylic acid-type surfactant and a succinic acid-type surfactant and water and a second stirring step of adding and, furthermore, stirring a powder of insulating inorganic particles to and in a stirred product of the first raw material. Hereinafter, there will be cases where the previous production method is referred to as "first production method" and the present production method is referred to as "second production method."

According to the second production method of the present disclosure, it is possible to easily produce composite particles having the insulating inorganic particle disposed in the outermost layer. When the composite particles are used, since it becomes difficult for the thermally conductive particles or the magnetic particles to come into contact with each other, the electrical resistance between the composite particles becomes large. Therefore, according to the second production method of the present disclosure, it is possible to produce a urethane foam-molded article having not only a high thermal conductivity but also a high electrically insulating property.

(10) In the configuration (8) or (9), an amount of the surfactant blended in the composite particle production step may be 0.1 parts by mass or more and 30 parts by mass or less with respect to 100 parts by mass of the powder of the thermally conductive particles. According to the present configuration, it is preferable to satisfy both improvement in the attachment property of the magnetic particles and reduction in the influence of the foam urethane resin raw material on foam molding.

Advantageous Effects of Invention

According to the urethane foam-molded article of the present disclosure, since the orientation of the composite particles is favorable, and a heat transfer path is formed by the composite particles connected with each other, a high thermal conductivity can be realized. In addition, since the unevenness in the configuration or size of the composite particles becomes small, it is easy to control a crosslinking reaction and a foaming reaction during foam molding, and the moldability is excellent. In addition, since the dispersibility of the composite particles is also favorable, the performance such as the heat dissipation property is less likely to vary with places. The method for producing a urethane foam-molded article of the present disclosure is excellent in terms of the granularity of the composite particles. In addition, according to the production method of the present disclosure, it is possible to easily produce the urethane foam-molded article of the present disclosure having a high thermal conductivity without impairing foam molding.

BRIEF DESCRIPTION OF DRAWINGS

The FIGURE is particle size distributions of powders of composite particles A to C produced in examples.

DESCRIPTION OF EMBODIMENTS

Hereinafter, an embodiment of a urethane foam-molded article of the present disclosure and a method for producing the same will be described. The embodiment is not limited to the following form and can be performed in a variety of modified forms or improved forms that can be performed by persons skilled in the art.

<Urethane Foam-Molded Article>

The urethane foam-molded article of the present disclosure has a base material made of polyurethane foam and composite particles that are included and oriented in the base material.

[Base Material]

The polyurethane foam of the base material is produced from a foam urethane resin raw material such as a polyisocyanate component and a polyol component. The details will be described in the method for producing a urethane foam-molded article of the present disclosure, which will be described below. The shape, size and the like of the base material are not particularly limited and may be determined as appropriate depending on uses. The composite particles that are included in the base material need to be oriented with a certain regularity. For example, the composite particles may be linearly disposed or may be disposed in a curved shape between one end and the other end (which may not be an end part opposite to the one end at 180°) of the urethane foam-molded article. In addition, the composite particles may be radially disposed from the center toward the outer circumference.

[Composite Particles]

The composite particles have thermally conductive particles that are made of a non-magnetic material and have a thermal conductivity of 200 W/m·K or higher and magnetic particles attached to the surfaces of the thermally conductive particles with a binder.

The thermally conductive particles are made of a non-magnetic material. In the present specification, diamagnetism materials and paramagnetic materials other than ferromagnet materials and antiferromagnet materials are referred to as non-magnetic materials. The thermal conductivity of the thermally conductive particles is 200 W/m·K or higher. Examples of the thermally conductive particles include carbon materials such as graphite and carbon fibers, aluminum, gold, silver, copper, alloys containing the above-described metal as a base metal and the like. As the thermally conductive particles, one kind of particles may be used or two or more kinds of particles may be jointly used.

The shape of the thermally conductive particle is not particularly limited as long as the thermally conductive particles can be composited with magnetic particles. For example, a variety of shapes such as a flaky shape, a fibrous shape, a columnar shape, a spherical shape, an elliptical shape and an oblong shape (a shape in which a pair of facing hemispheres are coupled with a cylinder) can be adopted. In a case where the thermally conductive particle forms a shape other than a sphere, the contact area between the composite particles becomes large. This makes it easy to secure a heat transfer path and also increases the amount of heat to be transferred. For example, graphite particles having a shape with a large aspect ratio are preferable since such composite particles can be procured at a relatively low cost.

Examples of the graphite include natural graphite such as scale-shaped graphite, scaly graphite and earthy graphite, artificial graphite and the like. Artificial graphite is less likely to form a scale shape. Therefore, natural graphite is preferable since natural graphite has a scale shape and a strong thermal conductivity improvement effect. In addition, expandable graphite containing a substance that generates gas by heating inserted between scale-shaped graphite layers may also be used as the graphite. When heat is applied to the expandable graphite, due to a generated gas, the space between the layers becomes wide, and a layer that is stable to heat or chemicals is formed. This stable layer becomes a heat-insulating layer and hinders the movement of heat, whereby a flame retardance effect is brought about. Preferable expandable graphite may be selected in consideration of the expansion start temperature, the expansion rate or the like. For example, the expansion start temperature of the expandable graphite is supposed to be higher than the heat generation temperature during the molding of the urethane foam-molded article. Specifically, expandable graphite having an expansion start temperature of 150° C. or higher is preferable.

Normally, urethane foam-molded articles have a dropping action of suppressing combustion by dropping sparks even when exposed to flame. However, when magnetic particles have been blended, there is a concern that the dropping action may be impaired and the self-extinguishing property of urethane foam-molded articles may deteriorate. Due to this point, in the urethane foam-molded articles of the present disclosure, the composite particles are oriented. Therefore, heat applied to the urethane foam-molded articles is likely to be transferred to the thermally conductive particles. Therefore, in a case where the thermally conductive particles are made of the expandable graphite, the expandable graphite rapidly reaches the expansion start temperature. This makes the flame retardance effect of the expandable graphite be rapidly exhibited. Therefore, the use of the expandable graphite as the thermally conductive particles suppresses the deterioration of the self-extinguishing property of the urethane foam-molded article and makes it possible to maintain the flame retardancy.

The size of the thermally conductive particle may be determined in consideration of the dispersibility, the size of the base material or the like. The average particle diameter of the thermally conductive particles is desirably 200 µm or more from the viewpoint of increasing the thermal conductivity of the urethane foam-molded article. On the other hand, when the dispersibility of the composite particles is taken into account, the average particle diameter is desirably 2000 µm or less. As the average particle diameter in the present specification, unless particularly otherwise described, the median diameter (D50) that is obtained from the volume-based particle size distribution measured by a laser diffraction and scattering method is adopted. Regarding commercially available products, catalog values may be adopted.

The magnetic particles are attached to the surfaces of the thermally conductive particles with a binder and play a role of orienting the thermally conductive particles. The magnetic particles need to be excellent in terms of magnetization properties, and particles of ferromagnetic materials such as iron, nickel, cobalt, gadolinium, stainless steel, magnetite, maghemite, manganese zinc ferrite, barium ferrite and strontium ferrite, antiferromagnetic materials such as MnO, $Cr_2O_3$, $FeCl_2$ and MnAs and alloys for which the above-described material is used are preferable. Among these, iron, nickel, cobalt and iron-based alloys thereof (including stainless steel) are preferable from the viewpoint of easy procurement as fine particles and high saturation magnetization. Particularly, iron is easily procured at a relatively low cost and is thus capable of cutting the production cost and preferable for mass production.

The magnetic particles may be directly attached to the surfaces of the thermally conductive particles or may be indirectly attached through other particles such as insulating inorganic particles to be described below. In addition, the magnetic particles may be attached to only part of the surfaces of the thermally conductive particles or may be attached so as to coat all of the surfaces. The size of the magnetic particle may be determined as appropriate in consideration of the size of the thermally conductive particle, the orientation of the composite particles, thermal conductivity between the composite particles or the like. For example, the particle diameter of the magnetic particle is desirably 1/10 or less of the particle diameter of the thermally conductive particle. When the size of the magnetic particle becomes small, there is a tendency that the saturation magnetization of the magnetic particles deteriorates. Therefore, the average particle diameter of the magnetic particles needs to be set to 100 nm or more in order to orient the composite particles with a smaller amount of the magnetic particles. The average particle diameter is more preferably 1 µm or more, furthermore, 5 µm or more.

The shape of the magnetic particle is not particularly limited. For example, in a case where the shape of the magnetic particle is flat, the distance between the thermally conductive particles adjacent to each other becomes short compared with the case of a spherical shape. Therefore, the thermal conductivity between the composite particles adjacent to each other improves. As a result, the thermal conductivity of the urethane foam-molded article improves. In addition, in a case where the shape of the magnetic particle is flat, the magnetic particle and the thermally conductive particle come into surface contact with each other. That is, the contact area between both particles becomes large. Therefore, the attachment force between the magnetic particle and the thermally conductive particle improves. Therefore, the magnetic particles are less likely to peel off. Additionally, the thermal conductivity between the magnetic particle and the thermally conductive particle also improves. For such reasons, flaky particles are desirably adopted as the magnetic particles.

In a case where a highly electrically conductive material is used for the thermally conductive particles or the magnetic particles, an electric conduction path is formed in the base material due to the composite particles that are oriented in a state of being connected with each other. Therefore, in order to apply the urethane foam-molded article of the present disclosure to members for which an electrically insulating property is required, such as heat dissipation members in electronic equipment, it is desirable to impart an electrically insulating property to the urethane foam-molded article. For example, it is preferable to configure the composite particles by attaching insulating inorganic particles in addition to the magnetic particles to the surfaces of the thermally conductive particles. In such a case, the thermally conductive particles or the magnetic particles (electrically conductive particles) are less likely to come into contact with each other between the composite particles adjacent to each other even when the composite particles are oriented. Therefore, the electrical resistance between the composite particles becomes large. In addition, the composite particles come into contact with each other through the insulating inorganic particles, which makes it possible to cut electrical conduction between the composite particles.

The insulating inorganic particles need to be the particles of an inorganic material having an insulating property. Particularly, the particles of an inorganic material having relatively a high thermal conductivity are desirable from the viewpoint of the thermal conductivity between the composite particles being not impaired. For example, the thermal conductivity of the insulating inorganic particles is preferably 5 W/m·K or higher. Examples of an insulating inorganic material having a thermal conductivity of 5 W/m·K or higher include aluminum hydroxide, aluminum oxide (alumina), magnesium hydroxide, magnesium oxide, talc, calcium carbonate, clay, mica, silica and the like.

The insulating inorganic particles may be directly attached to the surfaces of the thermally conductive particles or may be indirectly attached through the magnetic particles. In addition, the insulating inorganic particles may be attached to only part of the surfaces of the thermally conductive particles or may be attached so as to coat all of the surfaces. From the viewpoint of increasing the electrical resistance between the composite particles to enhance the electrically insulating property of the urethane foam-molded article, the insulating inorganic particles are desirably disposed in the outermost layers of the composite particles.

The shape of the insulating inorganic particle may be determined as appropriate in consideration of the attachment property to the thermally conductive particles and the magnetic particles and the electrically insulating property and the thermal conductivity between the composite particles. When the insulating inorganic particles are too large, the attachment property or the thermal conductivity between the composite particles deteriorates. For example, the particle diameter of the insulating inorganic particle is desirably $1/100$ or more and $1/10$ or less of the particle diameter of the thermally conductive particle. The shape of the insulating inorganic particle is not particularly limited. For example, in a case where the shape of the insulating inorganic particle is flat, it is possible to make the distance between the thermally conductive particles adjacent to each other short compared with the case of a spherical shape. Therefore, the thermal conductivity between the composite particles adjacent to each other is less likely to be impaired. In addition, the contact area becomes large, whereby the insulating inorganic particles are less likely to peel off.

The binder that attaches the thermally conductive particles and the magnetic particles or the like may be selected as appropriate in consideration of each kind of the particles, the influence on foam molding or the like. A water-soluble binder is preferable since the water-soluble binder has a small influence on foam molding and is excellent for environments. Examples thereof include methyl cellulose, carboxymethyl cellulose, hydroxypropyl methylcellulose, polyvinyl alcohol, starch and the like. The binder that attaches the magnetic particles and a binder that attaches the insulating inorganic particles may be the same as or different from each other.

The composite particles are surface-treated with one or more surfactants selected from a carboxylic acid-type surfactant and a succinic acid-type surfactant (hereinafter, appropriately referred to as "carboxylic acid-type/succinic acid-type surfactant"). The surface treatment may be performed on part of the composite particles (for example, only the surfaces of the magnetic particles or the like) or may be performed on all of the composite particles.

The carboxylic acid-type/succinic acid-type surfactant has a carboxy group (—COOH) as a polar group. The polar group reacts with a hydroxyl group (—OH) or the like present on the surface of the thermally conductive particle or the magnetic particle, whereby the attachment between both particles is accelerated. In addition, the surfactant is adsorbed to the surface of the thermally conductive particle or the magnetic particle by the polar group, and water or oxygen is blocked by a hydrophobic group on the opposite side, and thus an anti-rust property is also imparted. Therefore, the materials configuring the composite particles are less likely rust even when water is used during granulation. As described above, the use of the carboxylic acid-type/succinic acid-type surfactant does not only improve the attachment property between the particles but is also effective for the anti-rusting of the composite particles. Therefore, it is possible to cut the production cost by using relatively inexpensive materials, such as iron, for the magnetic particles.

Examples of the carboxylic acid-type surfactant include alkyl ether carboxylates and the like. Examples of the succinic acid-type surfactant include metal salts of alkenyl succinate and the like. Among these, the succinic acid-type surfactant does not only have a small influence on foam molding but also exhibits an excellent anti-rust property and is thus preferable. In addition, the carboxylic acid-type/succinic acid-type surfactant is water-soluble and can be dissolved in water and added at the time of granulating the composite particles, and it is thus possible to easily perform the surface treatment.

The content of the composite particles in the urethane foam-molded article of the present disclosure may be determined in consideration of a thermal conductivity improvement effect, the influence on a foaming reaction, the moldability or the like. For example, the content of the composite particles is desirably set to 20 vol % or less in a case where the volume of the urethane foam-molded article is set to 100 vol % in order to obtain a urethane foam-molded article having desired physical properties without impairing a foaming reaction. The content is more preferably set to 15 vol % or less. On the other hand, the content of the composite particles is desirably set to 3 vol % or more in order to increase the thermal conductivity. The content is more preferably set to 10 vol % or more.

In addition, from the viewpoint of improving the granulation property to decrease the number of the magnetic particles not configuring the composite particles, the content proportion of small particles having a particle diameter of 100 μm or less is desirably 10 mass % or less in a case where the total mass of the composite particles is set to 100 mass % in the particle size distribution of the composite particles. In the present specification, a mass-based frequency distribution obtained by a sieving method is adopted as the particle size distribution of the composite particles, and the content proportion of the small particles are calculated based on the frequency distribution.

The urethane foam-molded article of the present disclosure may further have insulating inorganic particles that are dispersed in the base material. That is, in the base material, insulating inorganic particles may be dispersed in addition to the oriented composite particles. The insulating inorganic particles that are dispersed in the base material may be the same as or different from the insulating inorganic particles that are added as a configuration particle of the composite particles in order to impart the electrically insulating property. In addition, the number of kinds of the insulating inorganic particles that are dispersed in the base material may be one or more. The insulating inorganic particles that are dispersed in the base material desirably have a relatively high thermal conductivity, and aluminum hydroxide, aluminum oxide (alumina), magnesium hydroxide, magnesium oxide, talc, calcium carbonate, clay, mica, silica and the like are preferable. When the insulating inorganic particles are dispersed in the base material, the insulating inorganic particles enter between the composite particles, and the composite particles are less likely to be electrically conductive with each other. Therefore, the electrically insulating property of the urethane foam-molded article improves. In addition, in a case where the thermal conductivity of the insulating inorganic particles is relatively high, a heat transfer path by the insulating inorganic particle is also formed in addition to the heat transfer path by the composite particles. Therefore, the thermal conductivity of the urethane foam-molded article further improves. In addition, in a case where the insulating inorganic particles are flame-retardant, the flame retardancy of the urethane foam-molded article improves.

<Method for Producing Urethane Foam-Molded Article>

The method for producing urethane foam-molded article of the present disclosure is not particularly limited. As a form of a preferable production method, the method for producing urethane foam-molded article of the present disclosure has a composite particle production step, a mixed raw material production step and a foam molding step. Hereinafter, each step will be described.

[Composite Particle Production Step]

The present step is a step of producing composite particles by stirring a granulation raw material having a powder of thermally conductive particles that are made of a non-magnetic material and have a thermal conductivity of 200 W/m·K or higher, a powder of magnetic particles, a binder, one or more surfactants selected from a carboxylic acid-type surfactant and a succinic acid-type surfactant and water.

The thermally conductive particles, the magnetic particles, the binder and the surfactants are as described above. Therefore, description thereof will be skipped. In addition, the amounts of the powder of the thermally conductive particles, the powder of the magnetic particles and the binder blended may be adjusted as appropriate in consideration of the magnetic field orientation of composite particles to be produced, the thermal conductivity in a case where the composite particles are blended with a urethane foam-molded article or the like.

For example, in a case where graphite is adopted as the thermally conductive particles, the amount of the powder of the thermally conductive particles blended is desirably set to 100 parts by mass or more and 200 parts by mass or less with respect to 100 parts by mass of the graphite powder. In a case where the amount of the powder of the magnetic powders blended is less than 100 parts by mass, since the amount of the magnetic particles attached is small, there is a concern that a magnetic property necessary for the orientation of the composite particles may lack. On the other hand, when the amount blended exceeds 200 parts by mass, the amount of the magnetic particles attached becomes excessive. Therefore, the mass of the urethane foam-molded article increases or the cost increases as much as the excessive amount.

The amount of the binder blended is desirably 2 mass % or more and 4 mass % or less as a sufficient amount necessary for the attachment of the particles in a case where the total mass of the powders, which are attachment objects, is set to 100 mass %. In a case where the amount of the binder blended is less than 2 mass %, the binder does not spread on the particle surfaces, and the attachment property deteriorates. On the other hand, when the amount blended exceeds 4 mass %, there is a concern that the composite particles may agglomerate together due to the excess binder. The binder may be a solid or a liquid. In a case where a water-soluble powder is used as the binder, water may be added after the binder and the powders of other raw materials are stirred in advance. In such a case, the agglomeration of the particles can be suppressed.

The amount of the carboxylic acid-type/succinic acid-type surfactant blended may be determined as appropriate depending on the amount of the thermally conductive particles, the magnetic particles or the like blended. The amount of the carboxylic acid-type/succinic acid-type surfactant blended is desirably 0.1 parts by mass or more with respect to 100 parts by mass of the powder of the thermally conductive particles from the viewpoint of enhancing the attachment property of the magnetic particles. The amount blended is more preferably 0.3 parts by mass or more. On the other hand, when the influence of a foam urethane resin raw material on foam molding is taken into account, the amount blended is desirably 30 parts by mass or less. The amount blended is more preferably 20 parts by mass or less.

The present step may be configured to have a preliminary stirring step of stirring a raw material containing water, the powder of the thermally conductive particles, the powder of the magnetic particles and the binder and a main stirring step of adding a surface treatment agent obtained by dissolving the carboxylic acid-type/succinic acid-type surfactant in water to a stirred product of the raw material and further stirring a mixture. First, in the preliminary stirring step, the powder raw materials and the binder are stirred after water is added thereto, whereby it is possible to suppress the agglomeration of the particles of the powder raw materials. Next, in the main stirring step, the addition of the surfactant obtained by dissolving the surfactant in water in advance makes it easy for the surfactant to spread on and react with all of the magnetic particles compared with a case where the surfactant is added as it is. In addition, such a configuration is easy to apply even in a case where a surfactant having poor solubility in water is used.

In addition, in a case where insulating inorganic particles are added as a configuration particle of the composite particles, the powder of the insulating inorganic particles may be included in the granulation raw material. In a case where the insulating inorganic particles are disposed in the outermost layers of the composite particles, the present step may be configured to have a first stirring step of stirring a first raw material having a powder of thermally conductive particles that are made of a non-magnetic material and have a thermal conductivity of 200 W/m·K or higher, a powder of magnetic particles, a binder, one or more surfactants selected from a carboxylic acid-type surfactant and a succinic acid-type surfactant and water and a second stirring step of adding and, furthermore, stirring a powder of the insulating inorganic particles to and in a stirred product of the first raw material (second production method). In addition, in a case where the present step is made up of the preliminary stirring step and the main stirring step as described above, the insulating inorganic particles may be added and stirred after the main stirring step.

For example, in a case where graphite is adopted as the thermally conductive particles, the amount of the powder of the insulating inorganic particles blended is desirably set to 30 parts by mass or more and 100 parts by mass or less with respect to 100 parts by mass of the graphite powder. In a case where the amount blended is less than 30 parts by mass, since the amount of the insulating inorganic particles attached is small, an effect of imparting an electrically insulating property is weak. On the other hand, when the amount blended exceeds 100 parts by mass, the amount of the insulating inorganic particles attached becomes large, and the thermal conductivity between the composite particles decreases. Therefore, the thermal conductivity of the urethane foam-molded article decreases.

Composite particles may be obtained by appropriately drying the stirred granulation raw material (the stirred product that is obtained in the second stirring step in the above-described second production method). In the obtained composite particles, the content proportion of small particles having a particle diameter of 100 μm or less is desirably 10 mass % or less in a case where the total mass of the composite particles is set to 100 mass %. When the content proportion of the small particles is small, it is possible to assume that desired composite particles having a relatively large amount of the magnetic particles or the like attached have been produced, and it is possible to realize the orientation state of the composite particles even with a relatively low magnetic field in the subsequent foam molding step. In addition, a step of removing the small particles in consideration of the moldability is also not required.

[Mixed Raw Material Production Step]

The present step is a step of producing a mixed raw material by mixing a powder of the composite particles produced in the previous step and a foam urethane resin raw material. As the powder of the composite particles, the composite particles as produced may be used as they are or may be used after large particles are appropriately removed or the like as necessary.

The foam urethane resin raw material may be prepared from raw materials that have been already known such as a polyol or a polyisocyanate. The polyol may be selected as appropriate from polyhydric hydroxy compounds, polyether polyols, polyester polyols, polymer polyols, polyether polyamines, polyester polyamines, alkylene polyols, urea-dispersed polyols, melamine-modified polyols, polycarbonate polyols, acrylic polyols, polybutadiene polyols, phenol-modified polyols and the like. In addition, the polyisocyanate may be selected as appropriate from, for example, tolylene diisocyanate, phenylene diisocyanate, xylylene diisocyanate, diphenylmethane diisocyanate, triphenylmethane triisocyanate, polymethylene polyphenylisocyanate, naphthalene diisocyanate, derivatives thereof (for example, prepolymers obtained by a reaction with polyols and modified polyisocyanates) and the like.

With the foam urethane resin raw material, a catalyst, a blowing agent, a foam stabilizer, a plasticizer, a crosslinking agent, a chain extender, a flame retardant, an antistatic agent, a thinner, a stabilizer, a filler, a colorant or the like may be further blended as appropriate. Examples of the catalyst include amine-based catalysts such as tetraethylenediamine, triethylenediamine and dimethylethanolamine and organo-metallic catalysts such as tin laurate and tin octoate. In addition, as the blowing agent, water is preferable. Examples thereof include, other than water, methylene chloride, fluorocarbons, $CO_2$ gas and the like. In addition, a silicone-based foam stabilizer is preferable as the foam stabilizer, and triethanolamine, diethanolamine and the like are preferable as the crosslinking agent. In the urethane foam-molded article of the present disclosure, separately from the composite particles, the insulating inorganic particles may be dispersed in the base material as described above. In the case of producing this form of urethane foam-molded article, the powder of the composite particles and the powder of the insulating inorganic particles may be mixed with the foam urethane resin raw material.

The mixed raw material can be produced by, for example, mechanically stirring the powder of the composite particles and the foam urethane resin raw material using a stirring blade or the like. In addition, the mixed raw material may also be produced by preparing two kinds of raw materials by adding the powder of the composite particles to at least one of the two components (a polyol raw material and a polyisocyanate raw material) of the foam urethane resin raw material and then mixing both raw materials. As described above, in order to obtain a urethane foam-molded article having desired physical properties without impairing a foaming reaction, the amount of the powder of the composite particles blended is desirably set to 20 vol % or less in a case where the volume of the urethane foam-molded article is set to 100 vol %. The amount blended is more preferably set to 15 vol % or less. On the other hand, the amount of the powder of the composite particles blended is desirably set to 3 vol % or more in order to obtain the thermal conductivity improvement effect. The amount blended is more preferably set to 10 vol % or more.

[Foam Molding Step]

The present step is a step of pouring the mixed raw material produced in the previous step into the cavity of a foaming mold and performing foam molding while applying a magnetic field such that the magnetic flux density in the cavity becomes substantially uniform.

The magnetic field needs to be formed in a direction in which the composite particles are oriented. For example, in a case where the composite particles are linearly oriented, the magnetic field is desirably formed so that magnetic field lines in the cavity of the foaming mold become substantially parallel from one end toward the other end of the cavity. In order to form such a magnetic field, for example, magnets need to be disposed near both surfaces of one end and the other end of the foaming mold so as to sandwich the foaming mold. As the magnets, permanent magnets or electromagnets may be used. When electromagnets are used, it is possible to turn the electromagnets on and off instantly to form the magnetic field, and it is easy to control the intensity of the magnetic field. Therefore, it is easy to control foam molding. In addition, the magnetic field lines configuring the magnetic field desirably form a closed loop. In such a case, the leakage of the magnetic field lines is suppressed, and it is possible to form a stable magnetic field in the cavity.

In the present step, the magnetic field is formed such that the magnetic flux density in the cavity becomes substantially uniform. For example, the difference in the magnetic flux density in the cavity is preferably within ±10%. The difference is more preferably within ±5%, furthermore, within ±3%. The uniform magnetic field formed in the cavity of the foaming mold makes it possible to suppress the uneven distribution of the composite particles and makes it possible to obtain a desired orientation state. In addition, the foam molding is preferably performed at a magnetic flux density of 150 mT or higher and 350 mT or lower. In such a case, it is possible to reliably orient the composite particles in the mixed raw material.

It is desirable to apply the magnetic field while the viscosity of the foam urethane resin raw material is relatively low. When the magnetic field is applied after the viscosity of the foam urethane resin raw material increases and the foam molding is finished to a certain extent, it is difficult to orient the composite particles, and thus it is difficult to obtain a desired thermal conductivity. There is no need to apply the magnetic field throughout the entire time while the foam molding is performed.

After the foam molding is finished in the present step, the mold is released, and the urethane foam-molded article of the present disclosure is obtained. At this time, depending on how to perform the foam molding, an epidermal layer is formed in at least one of one end and the other end of the urethane foam-molded article. The epidermal layer may be excised depending on uses (it is needless to say that the epidermal layer may not be excised).

Examples

Next, the present disclosure will be more specifically described using examples.
<Production of Composite Particles>
First, three kinds of composite particles A to C were produced as described below.
[Composite Particles A]
A granulation raw material having a powder of thermally conductive particles, a powder of magnetic particles, a binder, a succinic acid-type surfactant, a powder of insulating inorganic particles and water was stirred to produce composite particles A (composite particle production step). First, powders of two kinds of thermally conductive particles, powders of two kinds of magnetic particles and a binder were injected into the container of a high-speed stirring-type mixing granulator and mixed by blade stirring, furthermore, water was added thereto, and the components were mixed for one minute. Next, a surfactant obtained by dissolving a succinic acid-type surfactant in water was added thereto over a time of approximately 1.5 minutes under stirring. After that, a powder of insulating inorganic particles was injected thereinto, and the components were further mixed for four minutes. The stirring speed was set to 400 rpm. An obtained powder was dried and regarded as a powder of the composite particles A. The details of materials used are as described below, and the amounts thereof blended are shown in Table 1 (which is also true for the following composite particles B and C).
(a) Thermally Conductive Particles
Expandable graphite powder-1: "SYZR502FP" manufactured by Shijiazhuang-Aidite Trading Co., Ltd., particle diameters: 300 to 500 μm, thermal conductivity: 200 W/m·K.
Expandable graphite powder-2: "AED-03" manufactured by Fujikokuen Co., Ltd., particle size (sieve mesh size) of 3 mm: 80%, thermal conductivity: 200 W/m·K.
(b) Magnetic Particles
Stainless steel powder: "AKT" manufactured by Mitsubishi Steel Mfg. Co., Ltd., average particle diameter: 11.5 μm.
Iron powder: "SDP-4" manufactured by Dowa Electronics Materials Co., Ltd., average particle diameter: 45 μm.
(c) Insulating Inorganic Particles
Talc powder: "MJCRACE (registered trademark) K-1" manufactured by Nippon Talc Co., Ltd., average particle diameter: 8 μm.
(d) Binder
Starch: "INSTANT TENDER-JEL C" manufactured by Nihon Cornstarch corporation.
(e) Succinic Acid-Type Surfactant
Succinic acid-type anionic surfactant: "SANITBITOR (registered trademark) OMA-10" manufactured by Sanyo Chemical Industries, Ltd.

TABLE 1

| Granulation raw material | | Composite particles A | Composite particles B | Composite particles C |
|---|---|---|---|---|
| Thermally conductive particles [g] | Expandable graphite powder-1 | 500 | 500 | 500 |
| | Expandable graphite powder-2 | 500 | 500 | 500 |
| Magnetic particles [g] | Stainless steel powder | 500 | 500 | 500 |
| | Iron powder | 800 | 800 | 800 |
| Insulating inorganic particles [g] | Talc powder | 400 | 400 | 400 |
| Binder [g] | Starch | 72 | 72 | 72 |
| Surfactant [g] | Succinic acid type | 7 | — | — |
| | Amine-based | — | 7 | — |
| Water [g] | | 294 | 294 | 294 |

[Composite Particles B]
Composite particles B were produced by the same method as the method for producing the composite particles A except that the succinic acid-type surfactant was changed to an amine-based nonionic surfactant ("SANHIBITOR No. 50" manufactured by Sanyo Chemical Industries, Ltd.).
[Composite Particles C]
Composite particles C were produced by the same method as the method for producing the composite particles A except that the surfactant was not used. That is, powders of two kinds of thermally conductive particles, powders of two kinds of magnetic particles and a binder were mixed, furthermore, water was added thereto, the components were mixed for one minute, then, a powder of insulating inorganic particles was injected thereinto, and the components were mixed for four minutes. In addition, an obtained powder was dried and regarded as a powder of the composite particles C.
[Particle Size Distribution]
The powders of the composite particles A to C were sieved to measure the particle size distributions. The sieving was performed using metal sieves having mesh sizes of 45 μm, 100 μm, 300 μm, 500 μm, 710 μm, 1000 μm, 2000 μm and 3350 μm. The FIGURE shows the particle size distribution of the powder of each kind of the composite particles. As shown in the FIGURE, it was confirmed that, compared with the particle size distribution of the powder of the composite particles C, which were granulated without using the surfactant, in the particle size distributions of the powders of the composite particles A and B, which were granulated using the surfactant, the proportions of the small particles having a particle diameter of 100 μm or less were small. In Table 2, which will be shown below, cases where the content proportion of the small particles having a particle diameter of 100 μm or less was 10 mass % or less of all of the composite particles are indicated by O signs, and a case where the content proportion exceeded 10 mass % is indicated by a Δ sign.
[Anti-Rust Property]
The powders of the composite particles A to C were visually observed, and the presence or absence of rust was confirmed. As a result, as shown in Table 2, which will be shown below, the generation of rust was not observed in the composite particles A and B, which were granulated using the surfactant, but the generation of rust was confirmed in the composite particles C, which were granulated without using the surfactant.

<Production of Urethane Foam-Molded Article>

[Sample 1]

A urethane foam-molded article was produced using the produced composite particles A. First, 100 parts by mass of a polyether polyol ("S-0248" manufactured by Covestro AG), 2 parts by mass of diethylene glycol (manufactured by Mitsubishi Chemical Corporation) as a chain extender, 2 parts by mass of water as a blowing agent, 1.5 parts by mass of a tetraethylene diamine-based catalyst ("KAOLIZER (registered trademark) No. 31" manufactured by Kao Corporation) and 0.5 parts by mass of a silicone-based foam stabilizer ("SZ-1333" manufactured by DuPont Toray Specialty Materials Kabushiki Kaisha) were mixed to prepare a polyol raw material. In addition, as a polyisocyanate raw material, a diphenylmethane diisocyanate (MDI)-modified product was prepared. The MDI-modified product was produced by mixing a polyether polyol (the same as above) and 4,4'-diphenylmethanediisocyanate ("MILLIONATE MT" manufactured by Tosoh Corporation) so that the isocyanate (NCO) content reached 70 mass % and causing a reaction at 100° C. for 180 minutes under nitrogen purge. Next, 129.7 parts by mass of the composite particles A were added to and mixed with 100 parts by mass of the polyol raw material, thereby preparing a premix polyol. Subsequently, 100.6 g of the premix polyol and 13.7 g of the polyisocyanate raw material were mixed together and regarded as a mixed raw material (mixed raw material production step).

After that, the mixed raw material was poured into an aluminum foaming mold (the cavity was a cuboid that was 130 mm in length, 130 mm in width and 20 mm in thickness), and the foaming mold was sealed. In addition, the foaming mold was installed in a magnetic induction foam molding device, and foam molding was performed. In the cavity of the foaming mold, a uniform magnetic field was formed with magnetic field lines that were substantially parallel from above to below. The magnetic flux density in the cavity was 200 mT, and the difference in the magnetic flux density in the cavity was within ±3%. The foam molding was performed under the application of the magnetic field for the first two minutes and then performed without the application of the magnetic field for approximately five minutes (foam molding step). After the end of the foam molding, the mold was released, and a urethane foam-molded article was obtained. The obtained urethane foam-molded article is called a urethane foam-molded article of Sample 1. The content of the composite particles A in the urethane foam-molded article of Sample 1 was 4 vol % in a case where the volume of the urethane foam-molded article was set to 100 vol % and 42 mass % in a case where the mass of the urethane foam-molded article was set to 100 mass %. The urethane foam-molded article of Sample 1 is included in the concept of the urethane foam-molded article of the present disclosure.

[Sample 2]

A urethane foam-molded article of Sample 2 was produced by the same method as the method for producing Sample 1 except that the composite particles A were changed to the composite particles B.

[Sample 3]

A urethane foam-molded article of Sample 3 was produced by the same method as the method for producing Sample 1 except that the composite particles A were changed to the composite particles C.

<Evaluation of Urethane Foam-Molded Articles>

The moldability and thermal conductivity of the three produced samples were evaluated. Regarding the moldability, the Asker C hardness of each sample was measured using "ASKER Durometer Type C" manufactured by Kobunshi Keiki Co., Ltd. and evaluated based on the values of the Asker C hardness of Sample 3 having the composite particles C, which were granulated without using the surfactant. That is, when the value of the Asker C hardness was within ±5% of that of Sample 3, it was evaluated that there was no influence on foam molding (indicated by O signs in Table 2, which will be shown below); otherwise, it was evaluated that there was an influence on foam molding (indicated by x signs in the same table). Regarding the thermal conductivity, the thermal conductivity of each sample was measured using "HC-110" manufactured by EKO Instruments Co., Ltd. based on the heat flow meter method of JIS A 1412-2: 1999 and evaluated based on the values of the thermal conductivity of Sample 3 having the composite particles C. That is, when the value of the thermal conductivity was the same as or larger than that of Sample 3, the thermal conductivity was evaluated as favorable (indicated by O signs in Table 2, which will be shown below), and, when the value was smaller, the thermal conductivity was evaluated to decrease (indicated by x signs in the same table). Table 2 shows the evaluation results of the moldability and the thermal conductivity.

TABLE 2

|  |  | Sample 1 | Sample 2 | Sample 3 |
|---|---|---|---|---|
| Composite particles |  | A | B | C |
|  | Surfactant | Succinic acid type | Amine-based | None |
|  | Particle size distribution | O | O | Δ |
|  | Presence or absence of rust | Absent | Absent | Present |
| Urethane foam-molded article | Moldability (influence on foam molding) | O | x | — |
|  | Thermal conductivity | O | x | — |

As shown in Table 2, in the urethane foam-molded article of Sample 1 having the composite particles A surface-treated with the succinic acid-type surfactant, the thermal conductivity did not decrease and no influences on foam molding were observed; however, in the urethane foam-molded article of Sample 2 having the composite particles B surface-treated with the amino-based surfactant, the thermal conductivity and the hardness decreased and an influence on foam molding was confirmed.

INDUSTRIAL APPLICABILITY

The urethane foam-molded article of the present disclosure can be used in a wide range of fields such as automobiles, electronic equipment and buildings. For example, the urethane foam-molded article is preferable as a soundproofing material in engines, motors, EGR valves and the like that are disposed in automobile engine rooms, a soundproofing material for a motor that is used in office automation (OA) equipment or home appliances or a soundproofing material that is used in electronic equipment such as a personal computer.

The invention claimed is:

1. A urethane foam-molded article comprising:
a base material made of polyurethane foam; and
composite particles that are included and oriented in the base material,
wherein the composite particles have thermally conductive particles that are made of a non-magnetic material and have a thermal conductivity of 200 W/m·K or higher and magnetic particles attached to surfaces of the thermally conductive particles with a binder and are surface-treated with one or more surfactants selected from a carboxylic acid surfactant and a succinic acid surfactant;
wherein the thermally conductive particles have at least one of graphite particles and expanded graphite particles, and the magnetic particles have at least one of iron particles and stainless steel particles.

2. The urethane foam-molded article according to claim 1, wherein the succinic acid surfactant is included as the surfactant.

3. The urethane foam-molded article according to claim 1, wherein the surfactant is water-soluble.

4. The urethane foam-molded article according to claim 1, wherein, in a particle size distribution of the composite particles, a content proportion of small particles having a particle diameter of 100 μm or less is 10 mass % or less in a case where a total mass of the composite particles is set to 100 mass %.

5. The urethane foam-molded article according to claim 1, wherein an average particle diameter of the thermally conductive particles is 200 μm or more and 2000 μm or less.

6. The urethane foam-molded article according to claim 1, wherein the composite particles have insulating inorganic particles attached to the surfaces of the thermally conductive particles with a binder.

7. The urethane foam-molded article according to claim 1, wherein an average particle diameter of the thermally conductive particles is 200 μm or more and 200 μm or less,
the composite particles have insulating inorganic particles attached to the surfaces of the thermally conductive particles with a binder,
in a particle size distribution of the composite particles, a content proportion of small particles having a particle diameter of 100 μm or less is 10 mass % or less in a case where a total mass of the composite particles is set to 100 mass %, and
the surfactant is the succinic acid surfactant and is water-soluble.

8. A method for producing the urethane foam-molded article according to claim 1, the method comprising:
a composite particle production step of producing composite particles by stirring a granulation raw material having a powder of thermally conductive particles that are made of a non-magnetic material and have a thermal conductivity of 200 W/m·K or higher, a powder of magnetic particles, a binder, one or more surfactants selected from a carboxylic acid surfactant and a succinic acid surfactant and water;
a mixed raw material production step of producing a mixed raw material by mixing a powder of the composite particles and a foam urethane resin raw material; and
a foam molding step of pouring the mixed raw material into a cavity of a foaming mold and performing foam molding while applying a magnetic field such that a magnetic flux density in the cavity becomes uniform.

9. The method for producing a urethane foam-molded article according to claim 8, comprising:
a composite particle production step of producing composite particles;
a mixed raw material production step of producing a mixed raw material by mixing a powder of the composite particles and a foam urethane resin raw material; and
a foam molding step of pouring the mixed raw material into a cavity of a foaming mold and performing foam molding while applying a magnetic field such that a magnetic flux density in the cavity becomes uniform,
wherein the composite particle production step has
a first stirring step of stirring a first raw material having a powder of thermally conductive particles that are made of a non-magnetic material and have a thermal conductivity of 200 W/m·K or higher, a powder of magnetic particles, a binder, one or more surfactants selected from a carboxylic acid surfactant and a succinic acid surfactant and water and
a second stirring step of adding and, furthermore, stirring a powder of insulating inorganic particles to and in a stirred product of the first raw material.

10. The method for producing a urethane foam-molded article according to claim 8,
wherein an amount of the surfactant blended in the composite particle production step is 0.1 parts by mass or more and 30 parts by mass or less with respect to 100 parts by mass of the powder of the thermally conductive particles.

11. The method for producing a urethane foam-molded article according to claim 9,
wherein an amount of the surfactant blended in the composite particle production step is 0.1 parts by mass or more and 30 parts by mass or less with respect to 100 parts by mass of the powder of the thermally conductive particles.

* * * * *